United States Patent [19]
Zeyer

[11] Patent Number: 5,253,069
[45] Date of Patent: Oct. 12, 1993

[54] PHOTOGRAPHIC SLIDE-TO-VIDEO TAPE CONVERTER

[76] Inventor: William A. Zeyer, 6797 Glencoe Ave., Brooklyn, Ohio 44144

[21] Appl. No.: 796,773

[22] Filed: Nov. 25, 1991

[51] Int. Cl.[5] .............................................. H04N 5/30
[52] U.S. Cl. .................................. 358/209; 358/214; 358/54
[58] Field of Search ........................ 358/214, 209, 54; 352/85, 87, 89, 90, 94; 355/39, 64

[56] References Cited

U.S. PATENT DOCUMENTS

| | | | |
|---|---|---|---|
| 1,675,555 | 7/1928 | Howell | 352/90 |
| 2,626,537 | 2/1953 | Flank | 352/90 |
| 3,130,632 | 4/1964 | Borrowdale | 352/90 |
| 3,130,636 | 4/1964 | Fado | 352/90 |
| 3,165,025 | 1/1965 | Hart | 355/64 |
| 3,604,328 | 9/1971 | Nakagawa | 355/75 |
| 4,003,653 | 1/1977 | Kelly | 355/77 |
| 4,199,250 | 4/1980 | Durand | 355/39 |
| 4,239,376 | 12/1980 | Wyller | 355/27 |
| 4,245,906 | 1/1981 | Froehlich | 355/43 |

Primary Examiner—Michael T. Razavi
Assistant Examiner—Tuan V. Ho
Attorney, Agent, or Firm—Watts, Hoffmann, Fisher & Heinke

[57] ABSTRACT

A photographic slide-to-video tape converter having an elongated supporting base, a video camera mount associated with the base for detachably securing a video camera to the base with the camera lens in a predetermined position, support structure projecting from the base, a photographic slide carrier structure for supporting a slide for imaging by a camera connected to the base, and a light directing unit for directing light through a slide supported by the slide carrier into the lens of a video camera secured to the base. The slide carrier structure has a slide positioner and slide engaging assembly for receiving and supporting a slide at a predetermined position in alignment with the camera lens position. The light directing unit directs light through the slide to the camera lens.

6 Claims, 3 Drawing Sheets

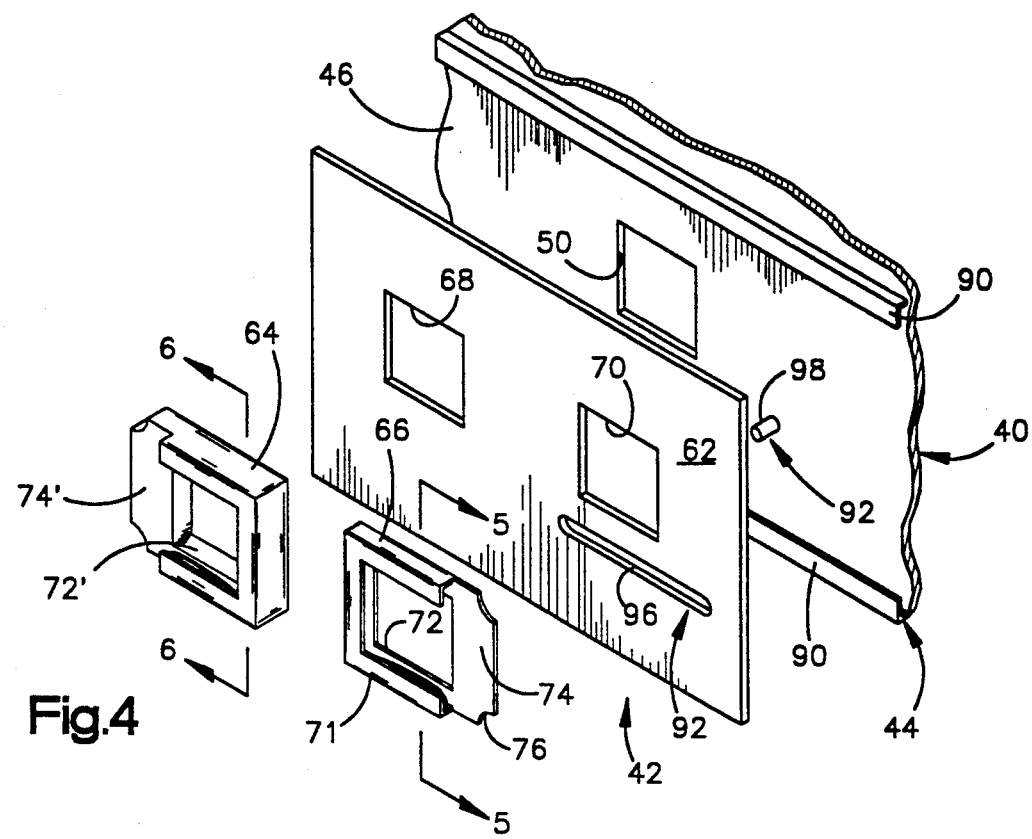
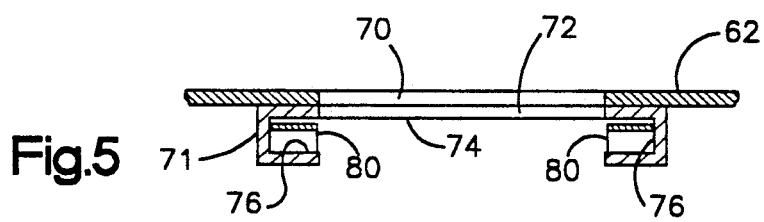
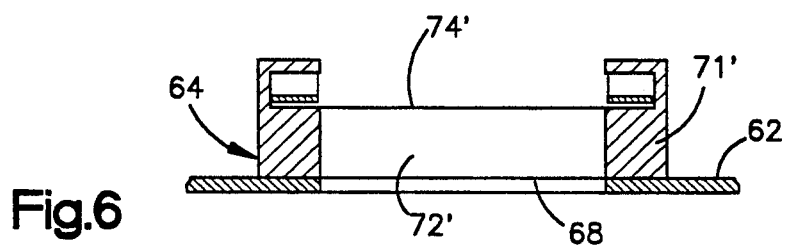
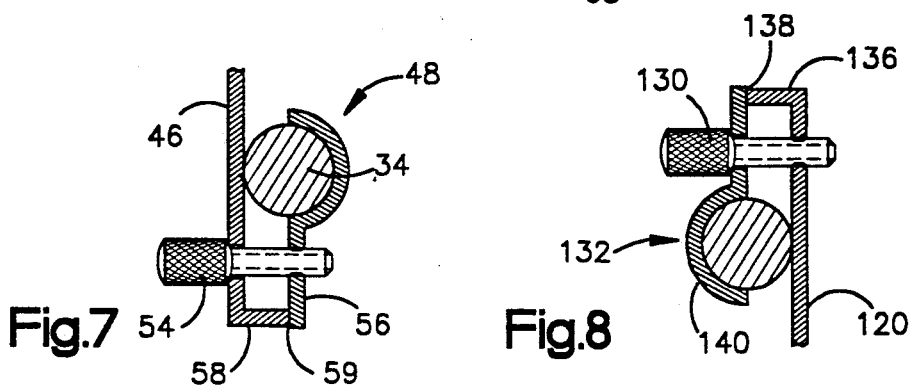

PHOTOGRAPHIC SLIDE-TO-VIDEO TAPE CONVERTER

BACKGROUND

1. Field of the Invention

The present invention relates to making video tape reproductions of still photographs and more particularly to apparatus by which still photographic transparencies, or "slides," are converted to still images on video tape recordings.

2. Prior Art

Devices for positioning still photographs for reproduction by motion picture film cameras, video tape recording cameras and still cameras have been proposed in the past. For the most part these proposals have been complex and therefore expensive to purchase for home use. In some cases the proposals have been of relatively uncomplicated constructions involving front lighted cards or signs. These were suitable for inserting captions and so forth in motion pictures, but not for use in reproducing still photographic "slides," particularly by video tape recording cameras. Some proposals have been made for projecting slides onto frosted glass screens for recording by video cameras. These have required standard slide projectors which use an intense light source for intermittently projecting slides. The intense light tended to damage video cameras focussed on the projection screen and to degrade the quality of the reproduction because the frosted screens produced grainy T.V. images.

Video tape recorders and video cameras have become relatively common household items as has the practice of preserving still photographic slides on video tape. Effective, inexpensive easily used devices for converting slides to video tape have not been available. Thus most slide conversions to video tape are made by professionals in studios.

The present invention provides a new and improved apparatus for converting slides to video tape images which is of relatively uncomplicated, inexpensive construction lending it to ordinary household use by individuals wishing to preserve their still slides on video tape.

DISCLOSURE OF THE INVENTION

The present invention provides a photographic slide-to-video tape converter comprising an elongated supporting base, a video camera mount associated with the base for detachably securing a video camera to the base with the camera lens in a predetermined position, support structure projecting from the base, a photographic slide carrier structure for supporting a slide for imaging by a camera connected to the base, and a light directing unit for directing light through a slide supported by the slide carrier into the lens of a video camera secured to the base. The slide carrier structure comprises a slide positioner and slide engaging assembly for receiving and supporting a slide at a predetermined position in alignment with the camera lens position. The light directing unit directs light through the slide to the camera lens so that the slide is "illuminated."

Additional features and advantages of the invention will become apparent from the following detailed description of a preferred embodiment made with reference to the accompanying drawings.

BRIEF DESCRIPTION OF THE DRAWINGS

FIG. 4 is a perspective, exploded view of part of the converter illustrated by FIG. 1;

FIG. 5 is a fragmentary cross sectional view seen approximately from the plane indicated by the line 5—5 of FIG. 4;

FIG. 6 is a fragmentary cross sectional view seen approximately from the plane indicated by the line 6—6 of FIG. 4;

FIG. 7 is a fragmentary cross sectional view seen approximately from the plane indicated by the line 7—7 of FIG. 1; and, FIG. 8 is a fragmentary cross sectional view seen approximately from the plane indicated by the line 8—8 of FIG. 2.

DESCRIPTION OF A PREFERRED EMBODIMENT

Figure 1:
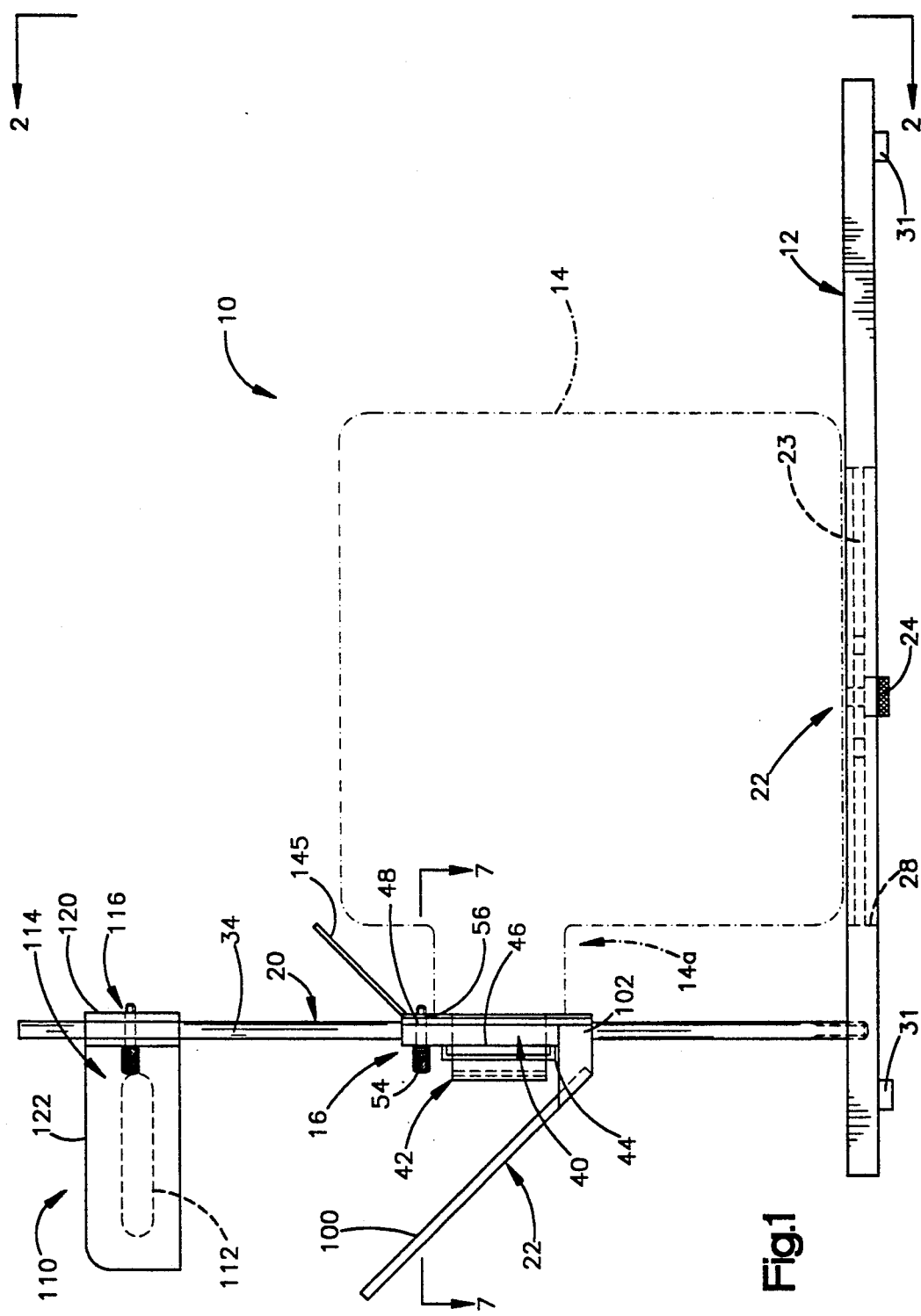
FIG. 1 is an elevational view of a slide converter constructed according to the invention.

A photographic slide-to-video tape converter 10 is illustrated in the drawings. Referring to FIG. 1, the converter 10 comprises an elongated supporting base 12 for supporting a video camera 14 in position to image and record the image from a slide on a photographic slide carrier structure 16. The slide carrier structure 16 is connected to a support structure 20 projecting from the base 12. A light directing unit 22 attached to the support structure 20 directs light through a slide in the carrier structure 16 into the lens 14a of the camera 14. The camera 14 can be of any commercially available brand and is therefore illustrated by broken lines. The positions of the camera and the photographic slide carrier are adjustable with respect to the base so that any video camera can be mounted for recording slides.

The base 12 is formed by a flat elongated generally rectangular body to which the structure 20 and the camera 14 are connected. A camera mounting assembly 22 connects the camera to the base for adjusting movement longitudinally of the base towards and away from the carrier structure. The assembly 22 comprises a camera mounting plate 23 and a camera mounting screw 24 which coact to secure the camera to the base. Opposite sides of the plate 23 are disposed in parallel guide slots 26 extending longitudinally along opposite sides of a central, rectangular base opening 28. The plate 22 rides in the opening 28 as its position is adjusted relative to the base. Transverse parallel mounting slots 30 extend across the plate 22. The mounting screw 24 is received in a selected slot 30 from the bottom of the base and threaded into the camera on top of the base. The screw is manually tightened by grasping its enlarged knurled head and threading it into the camera. As the screw advances the screw head engages the plate and clamps the plate 22 into engagement with the upper sides of the guide slots 26 to frictionally lock the camera in an adjusted position on the base with the camera lens 14a located as desired for recording slides.

The illustrated converter 10 is a home use device which is likely to be set up for use on a dining room table top, a counter top, etc. Accordingly the base 12 is provided with feet 31, one at each corner, for supporting the base in an elevated position. This assures clearance for the head of the screw 24 and minimizes contact between the base and its supporting surface. The feet can be of any suitable construction with a resilient rubber-like material being preferred to maximize frictional engagement with the underlying support surface and minimize the possibility of damaging the surface finish.

The support structure 20 provides for adjustably mounting the slide carrier structure 16 above the base 12 in alignment with the camera 14. In the preferred embodiment the structure 20 comprises smooth, parallel cylindrical rods 34 extending vertically upwardly from the base 12 when it is in its illustrated position. The rod ends are threaded and extend into tapped holes formed in the base 12.

The slide carrier structure 16 comprises a slide positioner 40 and a slide engaging assembly 42 for receiving and supporting a slide at a predetermined position in alignment with the camera lens 14a. The illustrated assembly 42 is supported by the positioner 40 and constructed and arranged for supporting vertically oriented slides separately from horizontally oriented slides. Therefore the carrier further comprises a guide structure 44 for governing motion of the slide engaging assembly relative to the positioner to align the respective slide types individually with the camera lens 14a.

The positioner 40 comprises a slide locating plate 46 and a clamping mechanism 48 for detachably securing the plate 46 to the support structure 20 at vertically adjustable locations. The illustrated plate 46 defines a central aperture 50 (See FIGS. 2 and 4) with which the camera lens is aligned when the camera and positioner are properly positioned for recording slides. The aperture 50 is generally square, with its side dimensions corresponding to that of a long side of the film in a slide. The aperture 50 thus accommodates both the vertically and horizontally oriented slides.

The clamping mechanism 48 is manually operated to detachably secure the positioner in a desired vertical position relative to the base 12 so the camera lens 14a can be positioned right against the plate 46 at the plane of the aperture 50. In the illustrated embodiment the clamping mechanism is formed by two identical clamps, one associated with each rod 34. Accordingly only one clamp is described and illustrated (See FIGS. 1 and 7) as comprising a thumb screw 54 and a clamp jaw 56 which are associated with the plate 46 to react against the plate and frictionally grip the rod 34 to lock the plate in position on the rod. In the illustrated clamp the screw 54 extends through a hole in the plate 46 and into a tapped hole in the clamp jaw. When the screw is advanced, the enlarged screw head engages the plate 46 and the screw tends to draw the plate and clamp jaw toward each other. The plate 46 defines an end lip 58 which engages the clamp jaw so that the clamp jaw tends to pivot about the line of engagement 59 between the end lip and the jaw as the screw is advanced. This pivots the opposite jaw end 60 into frictional engagement with the rod 34 to clamp the plate and rod together. Loosening the screw 54 reduces the frictional jaw gripping force on the rod and permits moving the plate 46 along the rod to another desired reclamping location. Any other suitable clamp mechanism can be employed.

Slides are manually fed into the slide engaging assembly 42 and aligned with the aperture 50 for recording. The illustrated assembly 42 (See FIG. 4) comprises a thin flat shuttle-like member 62, slide receiving members 64, 66 fixed to the shuttle member 62, and apertures 68, 70 formed in the shuttle member 62 in respective alignment with the slide receiving members 64, 66. In the preferred slide engaging assembly the slide receiving member 64 is specially constructed to receive only slides having vertical orientations (i.e. the long dimension of the film in the slide is vertically disposed when the image is "upright"). The slide receiving member 66 is constructed for receiving slides whose films have either vertical or horizontal orientations. The slide engaging assembly 42 is reciprocated along the plate to alternatively align the slide receiving members 64, 66 and their associate apertures with the plate aperture 50.

The member 66 is formed by a generally square peripherally extending body 71 attached to and seated on the shuttle member 62 and defining a rectangular central aperture aligned with and conforming to the shuttle member aperture 70 (See FIGS. 4 and 5). The aperture 72 is square with its side dimension corresponding to the long dimension of the film in a slide. The body 71 extends away from the shuttle member 62 a predetermined distance where it defines a slide engaging planar face 74 extending continuously about the aperture 72. Slides supported in the member 64 are seated against the face 74 to positively locate them a predetermined distance from the plane of the plate aperture 46.

The face 74 forms one side of a slide supporting groove 76 formed by the body 71 and extending about three sides of a slide in the member 66. The slide is introduced into the groove via an open side of the body 71. Leaf springs 80, respectively supported in the groove 76 along the top and bottom sides of the aperture, engage and press the slide against the face 74. The face 74 and springs 80 thus coact to block light from leaking around the slide to the camera lens. The corners of the face 74 at the open side of the body are notched to facilitate manual insertion and removal of slides.

The location of the face 74 is fixed so that when a camera lens has been positioned to view an initial horizontally oriented slide in the member 66 (usually when the lens is disposed virtually at the plane of the plate aperture 46) reciprocating the shuttle member 62 along the plate and replacement of the original slide with successors is accomplished without any need to readjust the camera position. The face 74 is located so that when the camera lens 14a is positioned as noted the image of the slide in the member 66 fully occupies the image format of the camera without "cutting off" or otherwise losing any portion of the image on the slide. This is relatively easily accomplished with a horizontally oriented slide because the format of the camera image, like the T.V. screen image, is a horizontally oriented rectangle compatible with the slide image orientation.

The slide receiving member 64 supports vertically oriented slides for imaging by the camera and is specially constructed and arranged to be compatible with the camera image format. That is, the entire vertical extent of the slide is imaged by the camera without requiring camera position adjustment from a position set up for imaging horizontally oriented slides. As suggested previously, vertically oriented slides tend to be incompatible with the format of a video camera image because the camera format image is a horizontally oriented rectangle. As a consequence, for example, if a vertically oriented slide is placed in the slide receiving member 66 and the camera 14 is not repositioned, the top and bottom of the slide film image is "cut off" in the camera image. The member 64 is constructed to avoid this result by positioning the vertical slides a sufficient distance away from the plane of the plate aperture 50 that the camera lens "sees" the entire vertical extent of the slide in its (the camera's) format without camera position adjustment.

The member 64 is constructed substantially like the member 66 and therefore the member 64 is not described in detail. Elements of the member 64 which are the same as those of the member 66 are indicated in the drawing by corresponding primed reference characters. The member 64 defines a slide engaging face 74' which is further from the plane of the plate aperture 50 than the face 74. This enables the format accommodation referred to. This increased spacing results from the body 71' being axially thicker than the body 71. In addition, the aperture 72' is vertically oriented and defines height and width dimensions which are the same as those of the slide film. This maximizes the light blocking action of the face 74'.

Video cameras are capable of imaging objects extremely close to the camera lens. This enables limited slide film areas to be focussed on and imaged by the camera 14. When a video tape image of a limited area of a slide film is desired the slide in question is placed in the member 66. Since the member 66 is constructed to support both "horizontal" and "vertical" slides the camera 14 can image localized areas of either type of slide in the member 66.

The guide structure 44 controls the reciprocating motion of the slide receiving assembly 42 so that slides supported by the members 64, 66 are quickly and accurately positioned for imaging. The illustrated guide structure 44 (See FIG. 4) comprises shuttle member guides 90 and a stop mechanism 92 which coact to guide the shuttle member 62 along the plate 46 and accurately position the member with respect to the aperture 50 for imaging slides. The guides 90 are fixed to the plate 46 and form a trackway for receiving the upper and lower edges of the member 62. The shuttle member moves along this trackway. The stop mechanism comprises an elongated slot 96 formed in the shuttle member and a pin 98 fixed in the plate 46 and projecting through the slot. The pin 98 engages the ends of the slot to define the limits of travel of the member 62. These limits coincide, respectively, with alignment of the apertures 72, 72' with the plate aperture 50.

The light directing unit 22 is constructed and arranged to direct light through a slide in the carrier 16 to the camera lens so that the slide is illuminated for imaging. The illustrated unit 22 comprises a reflective screen member 100 which diffuses light incident on it and directs the light toward and through the carrier. The screen 100 is attached to the plate 46 and extends at an angle with respect to the plate 46 for reflecting incident light. The screen member 100 is attached to the plate 46 by brackets 102 which fix the relative positions of the plate and screen and assure the screen is position adjusted relative to the camera 14 with the carrier. The brackets 102 might be replaced with adjustable supports if desired so the angle between the screen and the plate may be changed as desired.

Figure 2:
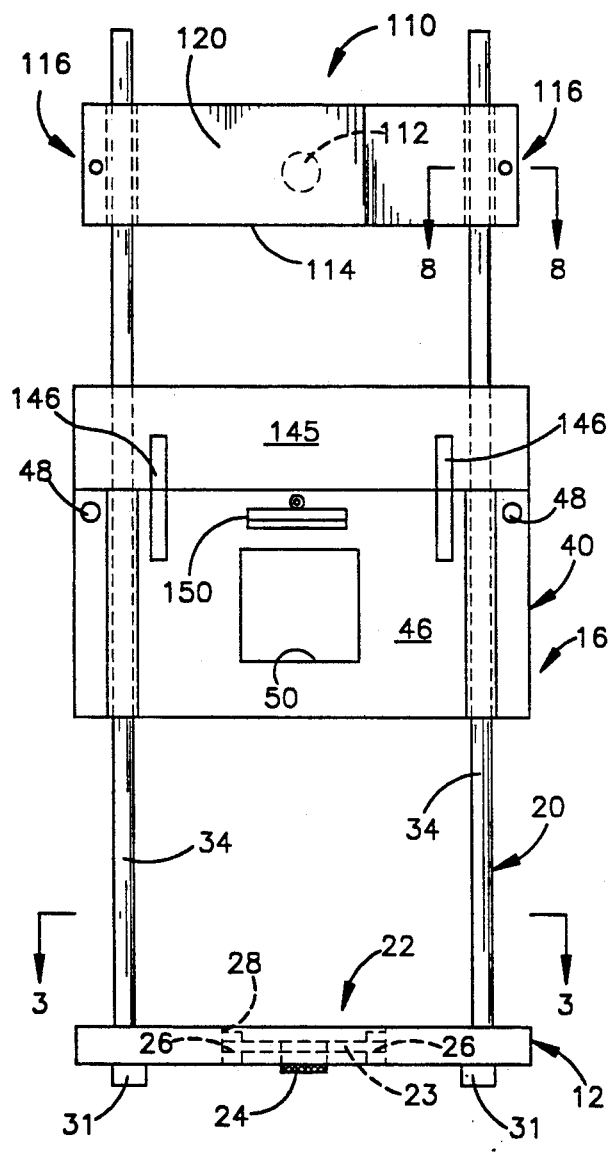
FIG. 2 is a side elevational view seen approximately from the plane indicated by the line 2—2 of FIG. 1.
Figure 3:
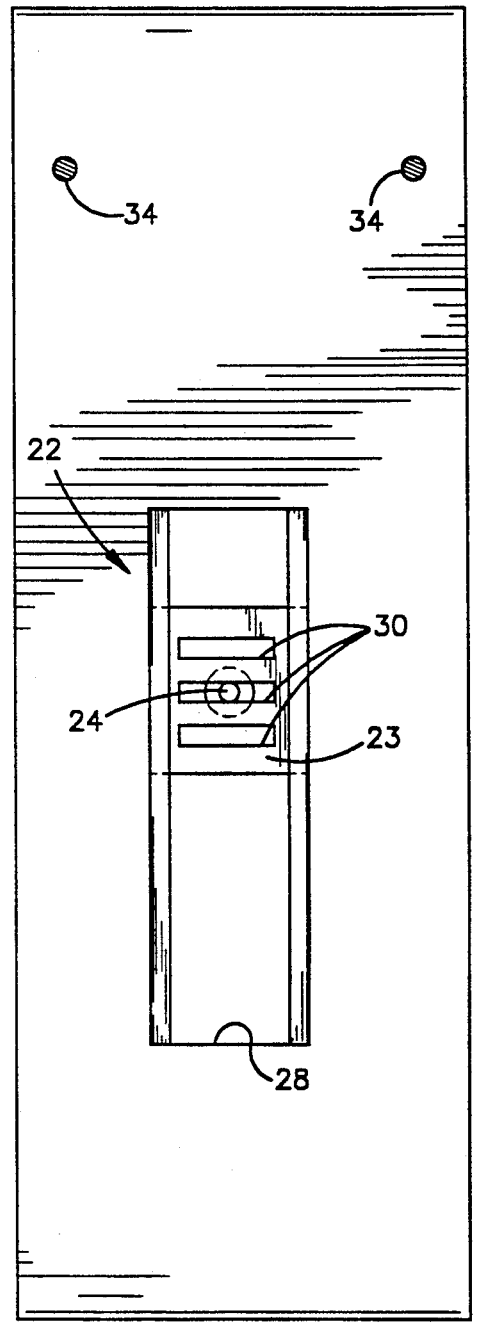
FIG. 3 is a plan view seen approximately from the plane indicated by the line 3—3 of FIG. 2 with parts shown in cross section.

The illustrated converter 10 is provided with a light source 110 (FIGS. 1, 2 and 8). The light source 110 comprises an electric light bulb 112, a bulb support assembly 114, and a clamp mechanism 116 for detachably securing the assembly 114 to the support structure 20. The bulb 112 and assembly 112 may be of any suitable or commercially available construction and are therefore schematically illustrated.

The assembly 114 comprises a support plate 120 extending transverse to the rods 34, a shade-like reflector 122 partially surrounding the bulb 112 and a bulb socket/switch unit, not illustrated, supported by the plate 120. The bulb is connected to an a.c. electric power supply by a suitable power cord, not shown. The reflector 122 is positioned to direct light from the bulb toward the screen 100. The intensity of the light incident on the screen depends primarily on the candle power of the bulb and the distance between the bulb and the screen. The preferred converter utilizes the equivalent of a 40 watt incandescent bulb. The light intensity might be controlled by including a dimmer circuit between the power supply and the bulb.

In the illustrated embodiment the light source 110 is shiftable relative to the carrier and the support structure so that the light source position can be changed to accommodate a changed carrier position as well as to adjust the intensity of light incident on the screen 100 (within limits). The clamp mechanism 116 enables this shifting. The illustrated clamp mechanism 116 comprises two identical clamps, one associated with each rod 34. Accordingly only one clamp is described and illustrated (FIG. 8) as comprising a thumb screw 130 and a clamp jaw 132 which are associated with the plate 120 to react against the plate and frictionally grip the rod 34 to lock the plate in position on the rod. In the illustrated clamp the screw 130 extends through a hole in the clamp jaw 132 and into a tapped hole in the plate 120. When the screw is advanced, the enlarged screw head engages the jaw and the screw tends to draw the plate and clamp jaw toward each other. The plate defines an end lip 136 which engages the jaw so that the clamp jaw tends to pivot about the line of engagement 138 between the end lip and the jaw as the screw is advanced. This pivots the opposite jaw end 140 into frictional engagement with the rod 34 to clamp the plate and rod. Loosening the screw 130 reduces the frictional jaw gripping force on the rod and permits moving the plate 120 along the rod to another desired reclamping location. Any other suitable clamp mechanism can be employed.

It should be appreciated that the construction of the converter 10 makes it possible to use a hand held light source, such as a small pocket flashlight, in addition to the source 110 for brightening areas of the screen 100 to in turn brighten desired areas of the slide being reproduced.

In the illustrated converter 10 (FIGS. 1 and 2) a light shield 145 is fixed to the carrier between the camera lens position and the light source to minimize the possibility of light from the source entering the lens 14a directly. The shield 145 is connected to the carrier by brackets 146 (schematically shown).

The converter 10 may also be used to record images of photographic prints. As seen in FIG. 2 a small print gripping clip 150 is secured to the plate 46 on its side facing the camera mounting position. The clip may be of any suitable, conventional construction and therefore is illustrated schematically. When reproducing prints the light source 110 may be removed entirely from the support structure 20 and placed on the table top adjacent the base 12 for front lighting the print.

While a single embodiment has been illustrated and described herein in considerable detail, the present invention is not to be considered limited to the precise construction disclosed. Various modifications, adaptations and uses of the invention may occur to those skilled in the art to which it pertains. The intention is to cover all such modifications, adaptations and uses which come within the spirit or scope of the appended claims.

Having described my invention I claim:

1. A photographic slide-to-video tape converter comprising:

an elongated supporting base;

video camera mounting means for detachably securing a video camera to the base with its lens in a predetermined position;

support structure projecting from said base;

photographic slide carrier structure supporting a slide for imaging by the camera comprising:

a slide positioner connected to said support structure;

slide engaging means for receiving and supporting a slide at a predetermined position with respect to the camera lens position;

position adjustment means for detachably securing said photographic slide positioner to said support structure to enable adjustment of said photographic slide carrier structure toward and away from said base relative to a video camera secured thereto; and, light directing means for directing light from a light source through a slide supported by said photographic slide carrier structure into the lens of a video camera secured to said base, said light directing means comprising a light reflecting member supported by said photographic slide carrier structure for reflecting light from the source toward the lens, said photographic slide positioner interposed between said light reflecting member and a video camera location on said base.

2. The converter claimed in claim 1 wherein said light reflecting member comprises a reflective screen member for diffusing light incident on it and directing the light toward and through the photographic slide carrier structure, said reflective screen member extending at angle with respect to the photographic slide carrier structure for reflecting incident light.

3. The converter claimed in claim 1 further comprising a light source comprising light emitting means and a supporting assembly therefor, said supporting assembly connected to said support structure for directing light to said light reflecting member.

4. The converter claimed in claim 3 further comprising light assembly position adjustment means for releasably securing said light source to said support structure for enabling adjustment of the light source position relative to said light reflecting member.

5. The converter claimed in claim 1 wherein said slide engaging means comprises a slide receiving member having an aperture alignable with a camera lens, a slide engaging face surrounding said aperture and a slide engaging element for seating a slide against said slide engaging face.

6. The converter claimed in claim 1 wherein said slide engaging means further comprises first and second slide receiving members and a shuttle member carrying said slide receiving members, said first slide receiving member constructed for receiving slides having vertically oriented slide films, said second slide receiving member constructed for receiving slides having horizontally oriented slide films, said first slide receiving member supporting slides at a location spaced further from the camera lens location than slides supported by the second slide receiving member, and said shuttle member supporting said slide receiving members for movement relative to said slide positioner.

* * * * *